United States Patent [19]

Blee et al.

[11] Patent Number: 5,896,482

[45] Date of Patent: *Apr. 20, 1999

[54] OPTICAL FIBER CABLE FOR UNDERWATER USE USING TERRESTRIAL OPTICAL FIBER CABLE

[75] Inventors: John James Blee, Lilburn; Nathan Everette Hardwick, III, Dunwoody; Krishnaswamy Kathiresan, Marietta, all of Ga.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/766,688

[22] Filed: Dec. 13, 1996

Related U.S. Application Data

[63] Continuation of application No. 08/359,796, Dec. 20, 1994, abandoned.

[51] Int. Cl.$^6$ ...................................................... G02B 6/44
[52] U.S. Cl. ........................... 385/107; 385/109; 385/113
[58] Field of Search ................................. 385/100, 101, 385/102, 106, 107, 108, 103, 109, 112, 113

[56] References Cited

U.S. PATENT DOCUMENTS

| | | | |
|---|---|---|---|
| 4,278,835 | 7/1981 | Jackson | 385/101 |
| 4,522,464 | 6/1985 | Thompson et al. | 385/107 |
| 4,696,543 | 9/1987 | Pitt et al. | 385/102 |
| 4,718,747 | 1/1988 | Bianchi et al. | 385/109 |
| 4,767,182 | 8/1988 | Parfree et al. | 385/107 |
| 4,818,060 | 4/1989 | Arroyo | 385/103 |
| 4,826,278 | 5/1989 | Gartside, III et al. | 385/105 |
| 4,874,219 | 10/1989 | Arroyo et al. | 385/107 |
| 4,974,926 | 12/1990 | Blee et al. | 385/107 |
| 5,140,664 | 8/1992 | Bosisio et al. | 385/113 |
| 5,199,096 | 3/1993 | Kathiresan et al. | 385/109 |
| 5,329,605 | 7/1994 | Wargotz | 385/107 |

OTHER PUBLICATIONS

K. Kathiresan, et al., A Fiber–Optic Cable for Hostile Environments—Proceedings of the International Wire and Cable Symposium, 1992.

N. E. Hardwick, III, et al., Corrosion–Resistant Armor to Prevent $H_2O$–Included Loss in Underwater (Wire–Armored) Fiber Optical Cable —Int'l Wire and Cable Symposiums, 1989, pp. 689–695.

*Primary Examiner*—Hemang Sanghavi

[57] ABSTRACT

An underwater optical fiber cable is constructed from a terrestrial optical fiber cable by hermetically enclosing the terrestrial optical fiber cable with a hydrogen barrier such as a copper tube or by using a terrestrial optical fiber cable having a hydrogen barrier therein, and by wrapping at least one layer of galvanized armor wires outside of the hydrogen barrier. As so reinforced, the terrestrial optical fiber cable has the strength needed for an underwater optical fiber cable by using relatively inexpensive galvanized armor wires. Although the galvanized armor wires generate hydrogen by contact with water, this hydrogen is prevented from adversely affecting optical fibers in the terrestrial optical fiber cable by the presence of the hydrogen barrier. Advantageously, a standard terrestrial optical fiber cable can be chosen from the many types available including high fiber count designs. Therefore, the flexibility of the core terrestrial cable choices permits system optimization and compatibility of underwater cores with shore cables without a proliferation of limited underwater cable designs. Also, the terrestrial optical fiber cable can be selected to include no hydrogen-generating material inside of the hydrogen barrier. Thus, the optical fiber cable of this invention will inherently have greater long-term reliability and, in the event of a rupture or leak in the hydrogen barrier, will last longer than optical fiber cables using hydrogen-generating material inside of a hydrogen barrier.

22 Claims, 1 Drawing Sheet

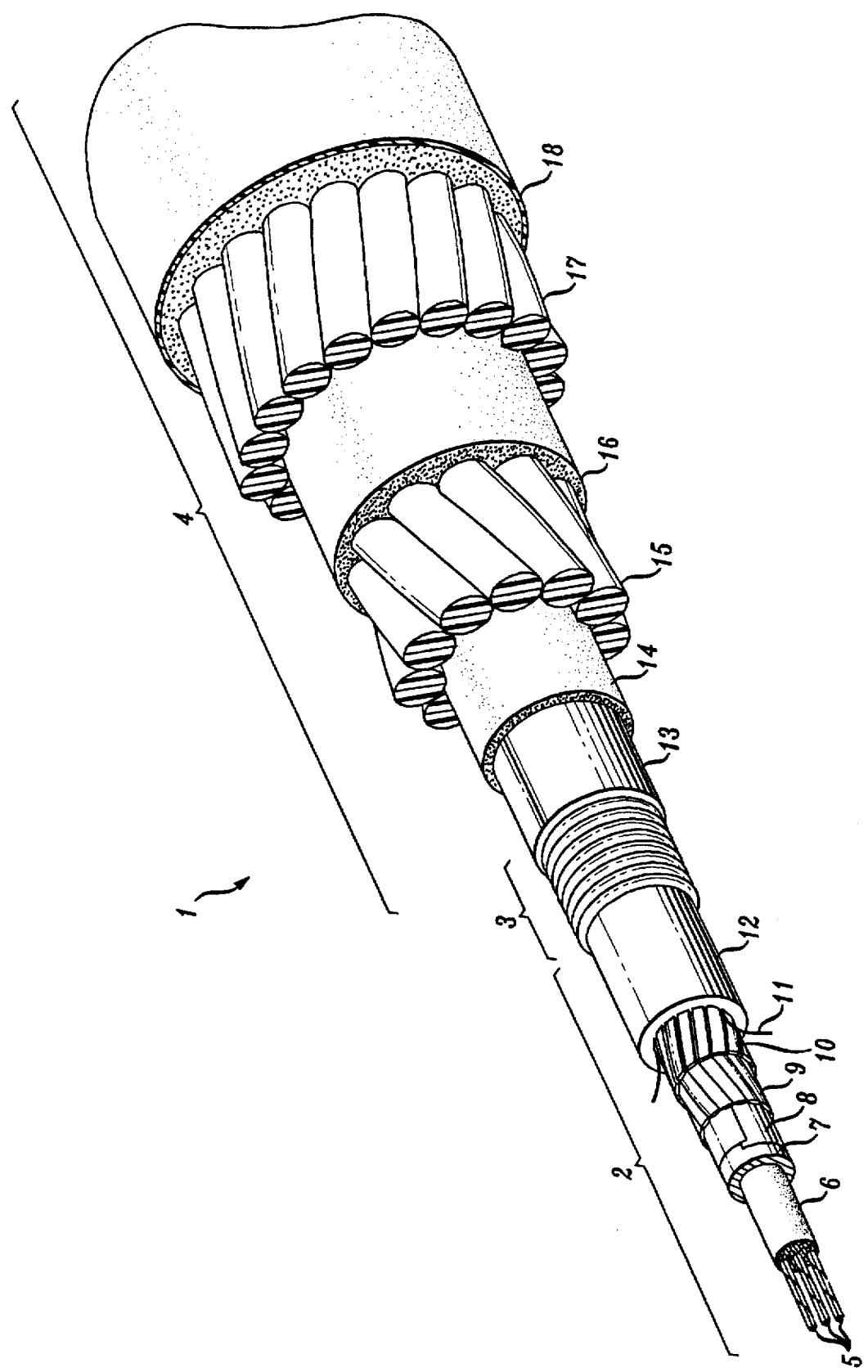

OPTICAL FIBER CABLE FOR UNDERWATER USE USING TERRESTRIAL OPTICAL FIBER CABLE

This application is a continuation of application Ser. No. 08/359,796 filed on Dec. 20, 1994, now abandoned.

BACKGROUND OF THE INVENTION

1. Field of the Invention

This invention is directed to a hydrogen-resistant optical fiber cable suitable for underwater use, and a method for making underwater hydrogen-resistant optical fiber cable using terrestrial optical fiber cable.

2. Description of the Related Art

Consumers have widely varying requirements in selecting underwater optical fiber cable. The consumer's intended application may require a certain minimum fiber count, the inclusion of certain materials to provide protection from the environment of use, the presence of conductors to supply power to optical repeaters, certain tensile strengths and/or numbers of layers of armor wires to prevent the cable from being damaged, etc. At present, consumers can select from only a few commercially available alternatives of underwater optical fiber cable. Consequently, consumers are often compelled to pay for expensive features of an underwater optical fiber cable that are not needed for his particular application. To eliminate unnecessary, expensive features, a consumer can design a customized underwater optical fiber cable specifically fitting the application requirements. However, such a design process often involves extensive research and development with an associated expense that tends to negate any savings that might accrue to the consumer by designing, as opposed to buying a preexisting underwater optical fiber cable. Therefore, there is a need among consumers in the optical fiber cable industry for a wider range of choice of underwater optical fiber cables for such features as cable type and fiber count, and preferably, as wide a range of choice as is available to consumers of terrestrial optical fiber cable.

Even those few underwater optical fiber cables that are commercially available to consumers suffer from drawbacks in design or expense in relation to the problem of hydrogen-generation in underwater optical fiber cables. Optical fiber cables often include galvanized armor wires to reinforce the cable, that have been found to generate hydrogen gas when contacted by water ($H_2O$). This hydrogen can pass through the cable into its core and permeate the optical fibers. Hydrogen-permeated optical fibers lose their transmissivity and greatly attenuate light passing therethrough, thus requiring much greater power for optical data transmission, reduced spacing between repeaters, or possibly even rendering the optical fibers unusable.

One approach to solving this problem has focused on reducing or preventing the generation of hydrogen in the materials composing the optical fiber cable. This can be done by using an optical fiber cable oversheath with stainless steel armor wires that are less prone to generating hydrogen than are galvanized armor wires. Nonetheless, the stainless steel armor wires can generate hydrogen under certain conditions if contacted by water. Accordingly, stainless steel armor wires have been coated with plastic to prevent the contact of water with the metal (see, e.g., U.S. Pat. No. 4,974,926 of John J. Blee, et al.). Although this approach has been proven effective in preventing hydrogen-generation, it is not without extra cost. Stainless steel armor wires with plastic coatings significantly increase the cost of an optical fiber cable.

Another approach to solving the hydrogen-generation problem while retaining the flexibility of the many types of low cost, high fiber count terrestrial cable is to convert a standard terrestrial cable to a robust underwater cable by using a hydrogen barrier such as a welded, corrugated copper tube to enclose hermetically the preexisting terrestrial cable. This approach, used in the present invention, permits the use of a relatively inexpensive galvanized armor wire in the optical fiber cable oversheath because the copper tube provides a hydrogen barrier to protect the terrestrial cables from hydrogen contamination. With the use of galvanized armor wire in the oversheath, significant cost reduction is obtained, and further, any hydrogen generated by the galvanized armor wire is prevented from permeating the optical fibers.

In addition to the flexibility of providing a myriad of fiber core configurations immediately by merely choosing the appropriate existing terrestrial cable, the terrestrial cable in the core provides a "stand-alone" cable that can continue and/or form a standard connection with like cable on the shore ends.

Besides the functional conformance advantages of optimizing the core cable for the task, the core cable can also be chosen such that they have no metal and/or wire reinforcement inside of the hydrogen barrier. In the event of a leak or rupture in the hydrogen barrier allowing water to enter, this metal or wire could generate hydrogen in close proximity to optical fibers. This hydrogen is likely to contaminate the optical fibers, reducing their performance or rendering them unusable. It would be desirable to eliminate this deficiency of most presently-known optical fiber cables that use a hydrogen barrier.

SUMMARY OF THE INVENTION

The present invention overcomes the above-noted deficiencies of currently-known optical fiber cable configurations and provides a wider range of choice for consumers in the selection of underwater optical fiber cable and, more importantly, the flexibility to choose the type and fiber count of the fiber core at the time of application without being limited to an á ptiori design. Briefly stated, a first aspect of the present invention is directed to a standard terrestrial-type optical fiber cable including a core with optical fibers, a hydrogen barrier such as a welded copper layer (tube), for hermetically enclosing the core, and an oversheath with galvanized armor wires arranged outside of the hydrogen barrier.

In the second aspect of this invention, the terrestrial optical fiber cable inside of the hydrogen barrier can be chosen so as to include no hydrogen-generating material. In the event that the hydrogen barrier is ruptured or leaks, the optical fiber cable of the present invention will last longer than optical fiber cables that use hydrogen-generating material such as steel inside of a hydrogen barrier.

Also, according to a third aspect of the present invention, a method includes a step of hermetically enclosing a terrestrial cable with a hydrogen barrier such as a copper tube, and a step of wrapping galvanized armor wire about the hydrogen barrier, to produce an underwater optical fiber cable. The copper will block the diffusion of hydrogen generated by either the corrosion of the armor wires or any other means outside of the hydrogen barrier. Also, the copper will not generate hydrogen itself even in the presence of water. In addition, the copper (or other metallic barrier) can be readily corrugated, if desired, to create a more supple underwater cable (i.e., with greater mechanical flexibility) and consequently possesses the ability to be subjective to a much tighter bend radius when compared to typical submarine cable which is not corrugated. With this method (i.e. the third aspect), of the present invention a consumer is able to select a cable configuration meeting the needs of the consumer from among a wide variety of terrestrial optical fiber cables, and convert the selected terrestrial optical fiber cable into an optical fiber cable suitable for underwater use. Therefore, the methods of the present invention greatly expand the choices of type and fiber count for underwater optical fiber cable for the consumer so that the consumer can select an underwater optical fiber cable more tailored to the consumer's individual requirements, without the added cost of designing a specific specialized cable.

These together with other objectives and advantages of this invention which will become subsequently apparent, reside in the details of construction and operation as more fully hereinafter described and claimed, reference being had to the accompanying drawing, forming a part hereof, wherein like numerals refer to like parts throughout.

BRIEF DESCRIPTION OF THE DRAWINGS

The present invention can be better understood with reference to the following drawing. The drawing is not necessarily to scale, emphasis instead being placed upon clearly illustrating principles of the present invention.

FIG. 1 is a partial cutaway perspective drawing of an optical fiber cable suitable for underwater use, in accordance with the present invention.

DESCRIPTION OF THE PREFERRED EMBODIMENTS

In FIG. 1, an optical fiber cable 1 suitable for underwater use in accordance with the present invention, primarily includes a terrestrial optical fiber cable 2, a hydrogen barrier 3 and a galvanized armor wire (or other metal armor wire) oversheath 4. The specific type of terrestrial optical fiber cable 2 illustrated in FIG. 1, is a dielectric crossply type (see U.S. Pat. No. 5,243,675) including optical fibers 5 (preferably in LIGHTPAK® or ACCURIBBONO ® configuration (see U.S. Pat. Nos. 4,826,278 to C. H. Gartside et al. and 4,900,126 to K. W. Jackson, et al. for more details on these optical fiber configurations)). The optical fibers 5 are set in a water blocking filling compound 6 contained in a high-density polyethylene (HDPE) or polypropylene core tube 7 enclosing the optical fibers 5. The core tube 7 has a water-blocking tape 8 wrapped therearound. A first dielectric ply layer 9 is coiled or wrapped in a first direction about the water-blocking tape 8 and the HDPE core tube 7. Coiled in a second direction on the first dielectric ply layer 9, is a second dielectric ply layer 10. The first and second dielectric ply layers 9, 10 provide structural strength to protect the optical fibers 5 from breaking through excessive bending while maintaining flexibility of the cable during manipulation thereof. Also, the terrestrial optical fiber cable 2 illustrated in FIG. 1 includes rip cords 11 and a HDPE jacket 12 covering the terrestrial optical fiber cable 2. The rip cords 11 are composed of a strong aramid yarn material such as KEVLARO ® and allow a service person to tear open the jacket 12 by pulling on one of the rip cords 11.

In accordance with the invention, the optical fiber cable 1 includes a hydrogen barrier 3 that hermetically encloses the terrestrial optical fiber cable 2 to prevent any hydrogen generated from outside of the hydrogen barrier 3 from reaching and contaminating the optical fibers 5. The hydrogen barrier 3 can be a copper tube formed from an elongated copper sheet folded lengthwise about the terrestrial optical fiber cable 2 and welded or braised along the longitudinal axis of the optical fiber cable 1, to enclose hermetically the terrestrial optical fiber cable 2. Alternatively, the terrestrial optical fiber cable 2 can be a type that includes a hydrogen barrier 3 hermetically enclosing the optical fibers as a part thereof, in which case another hydrogen barrier does not need to be provided outside of this type of terrestrial optical fiber cable. Also, for improved handling and flexibility, the hydrogen barrier 3 can be corrugated as shown in FIG. 1.

Enclosing the outside of the hydrogen barrier 3 or the outside of a terrestrial optical fiber cable 2 including a hydrogen barrier 3 as a part thereof, is the galvanized armor wire oversheath 4. The oversheath 4 includes a thin outer jacket 13 composed of HDPE and a tar-impregnated twine bedding layer 14 that provides a relatively uniform round surface upon which a first layer of a plurality of galvanized armor wires 15 can be wrapped. The galvanized armor wires 15 provide the necessary tensile stiffness needed during installation to prevent excessive strain of the optical fibers, mechanical protection from outside disturbances, as well as the structural strength needed for underwater cables as relatively long lengths of cable must be lifted to bring the cable to the water's surface for servicing. In other words, the weight of the cable could break the optical fibers 5 at the point of lifting the cable without the strength provided by the galvanized armor wires 15. The galvanizing of the armor wires 15 provides a significantly reduced level of corrosion, and is economically less costly than would be stainless steel wires. However, metal armor wires could also be used. Depending on the submerged depth of use or other factors, the optical fiber cable 1 can include an additional strength layer by wrapping a tar-impregnated twine bedding layer 16 about the first galvanized armor wires 15, to provide a relatively uniform round surface, and by wrapping a second plurality of galvanized armor wires 17 (or other metal armor wire) in the opposite direction to the direction of wrapping of the first galvanized armor wires 15. If desired, another tar-impregnated twine bedding layer 18 can be wrapped around the second galvanized armor wires 17 to provide a smooth outer surface for the optical fiber cable 1.

Although the specific embodiment of the optical fiber cable 1 shown in FIG. 1 is a dielectric crossply optical fiber cable, other configurations can be used as the terrestrial optical fiber cable 2 and/or the hydrogen barrier 3 in the first aspect of the present invention. For example, a hostile environment optical fiber cable structured to resist damage when exposed to high-temperature, high-moisture and/or high velocity steam environments, can be used as the terrestrial optical fiber cable 2 and/or the hydrogen barrier 3. The hostile environment optical fiber cable can be a cable such as those disclosed in U.S. Pat. Nos. 5,243,675 and 5,199,096, both of which are incorporated herein by reference as if set forth in full hereinbelow.

In the second aspect of the present invention, however, the terrestrial optical fiber cable 2 can be chosen so as to exclude any hydrogen-generating material such as steel inside of the hydrogen barrier 3. Thus, even in the event that the hydrogen barrier 3 is ruptured or leaks, there is no material inside of the hydrogen barrier capable of generating hydrogen that would contaminate the optical fibers 5. Although the first and/or second galvanized armor wires 15 and 17 will generate hydrogen that would pass through the rupture or leak in the hydrogen barrier 3, the problem is local and is not exacerbated by the presence of hydrogen-generating material inside of the hydrogen barrier 3. Therefore, the longevity of the optical fibers 5 is greatly increased by there not being any hydrogen-generating material such as steel inside of the hydrogen barrier 3 in relatively close proximity to the optical fibers 5. Thus, the second aspect of the present invention provides an extra level of reliability by precluding any potential hydrogen problems due to core moisture from manufacturing or use by excluding any hydrogen-generating material from the terrestrial optical fiber cable 2.

The third aspect of the present invention is a method for converting a terrestrial optical fiber cable 2 into an optical fiber cable 1 suitable for underwater use. The method includes a step of hermetically enclosing a terrestrial optical fiber cable 2 with a hydrogen barrier 3, and a step of wrapping galvanized armor wires 15 and/or 17 outside of the hydrogen barrier 3. The method can also include steps of forming a thin outer jacket 13 around the hydrogen barrier 3 and/or a step of wrapping a tar-impregnated twine bedding layer 14 around the thin outer jacket 13. The method can also include a step of wrapping a tar-impregnated twine bedding layer 16 around the galvanized armor wires 15, and a step of wrapping a tar-impregnated twine bedding layer 18 around the galvanized armor wire 17.

This third aspect of the present invention provides a major advantage over previous optical fiber cables in that almost any terrestrial optical fiber cable 2 can be converted into an optical fiber cable 1 suitable for underwater use. Thus, without the necessity of undergoing an expensive custom-designing process to develop a particular underwater optical fiber cable, a user can select from a wide variety of terrestrial optical fiber cables 2 to obtain a cable well-suited to a consumer's individual needs, and the selected terrestrial optical fiber cable 2 can be converted into an underwater optical fiber cable 1 using the method of the third aspect of the present invention. Because the method of the third aspect of the present invention hermetically encloses a terrestrial optical fiber cable 2 within a hydrogen barrier 3 and also provides an oversheath 4 including galvanized armor wires 15 and/or 17, the strength and cost advantages of galvanized armor wires can be used without deleterious effects because hydrogen generated by the galvanized armor wires 15 and/or 17 is prevented by the hydrogen barrier 3 from reaching the optical fibers 5.

In operation, a reel, spool or pan of optical fiber cable 1 in accordance with the subject invention, is loaded onto a platform such as a boat or barge, for example. The platform is driven across a body of water while trailing the optical fiber cable so that optical fiber cable 1 is fed from the reel, spool or pan. As a result, the optical fiber cable 1 is laid across the bottom of a body of water to allow for the establishment of optical data transmission between land locations separated by the body of water.

Although the present invention has been described with specific illustrations and embodiments, it will be clear to those of ordinary skill in the art that various modifications may be made therein without departing from the spirit and scope of the invention. For example, although specific terrestrial optical fiber cable 1 is illustrated in FIG. 1, other terrestrial optical fiber cables 1 can be used in accordance with the first, second and/or third aspects of the present invention. Also, although copper is used to form the hydrogen barrier 3 as described herein, other materials that prevent the ingress of hydrogen can be used. Further, the armor wires 15, 17 can be made of steel or other material of high tensile strength. In addition, the tar-impregnated twine bedding layers 14 and/or 16 can be replaced with an outer jacket of a polymer such as polyethylene.

We claim:

1. An optical fiber cable for use underwater, comprising:
   a terrestrial optical fiber cable comprising non-hydrogen generating components throughout and having a core portion containing at least one optical fiber and an outer jacket surrounding said core portion;
   a hydrogen barrier hermetically enclosing the outer jacket of said terrestrial optical fiber cable made of non-hydrogen generating material; and
   an oversheath enclosing said terrestrial optical fiber cable and said hydrogen barrier, the oversheath having uncoated hydrogen generating strength members to reinforce the terrestrial optical fiber cable.

2. The underwater cable as claimed in claim 1, wherein said hydrogen barrier includes a copper tube hermetically enclosing said terrestrial optical fiber cable.

3. The underwater cable as claimed in claim 2, wherein the hydrogen-generating strength members are galvanized metallic wires.

4. The underwater cable as claimed in claim 2, wherein the hydrogen-generating strength members are galvanized steel wires.

5. The underwater cable as claimed in claim 2, wherein said copper tube is corrugated.

6. The underwater cable as claimed in claim 1, wherein said oversheath includes plural layers of galvanized armor wires.

7. The underwater cable as claimed in claim 1, wherein said oversheath includes a tar-impregnated twine bedding layer.

8. The underwater cable as claimed in claim 1, wherein said hydrogen barrier is enclosed with a thin outer jacket composed of a polymer material.

9. The underwater cable as claimed in claim 8, wherein the polymer material is composed of high-density polyethylene.

10. The underwater cable as claimed in claim 1, wherein said terrestrial optical fiber cable is a hostile environment optical fiber cable.

11. The underwater cable as claimed in claim 1, wherein the hydrogen-generating strength members are galvanized metallic wires.

12. The underwater cable as claimed in claim 1, wherein the hydrogen-generating strength members are galvanized steel wires.

13. A method of forming an optical fiber cable for use underwater, comprising the steps of:
   a) hermetically enclosing a terrestrial optical fiber cable with a hydrogen barrier made of non-hydrogen generating material, said terrestrial optical fiber cable comprising non-hydrogen generating components throughout and having a core portion containing at least one optical fiber and an outer jacket surrounding said core portion; and
   b) wrapping uncoated hydrogen generating armor wires around the cable exteriorly of the hydrogen barrier.

14. The method as claimed in claim 13, wherein said uncoated hydrogen generating armor wires are composed of galvanized steel armor wires.

15. The method as claimed in claim 13, wherein said step (a) includes the substeps of
   a1) folding an elongated copper sheet around the terrestrial optical fiber cable, the copper sheet to serve as the hydrogen barrier; and
   a2) welding the elongated copper sheet longitudinally along a location at which edges of the elongated copper sheet meet or overlap, to form a weld seam hermetically enclosing the terrestrial optical fiber cable.

16. The method as claimed in claim 15, further comprising the step of:

c) corrugating the hydrogen barrier prior to enclosing the cable.

17. A method as claimed in claim 13, further comprising the step of:

c) forming a thin outer jacket of high-density polyethylene on the hydrogen barrier.

18. The method as claimed in claim 17, further comprising the step of:

d) wrapping a tar-impregnated twine bedding layer on the thin outer jacket.

19. A method as claimed in claim 13, wherein said step (b) includes the substeps of:

b1) wrapping a first plurality of galvanized armor wires outside of the hydrogen barrier; and b2) wrapping a second plurality of galvanized armor wires outside of the first plurality of galvanized armor wires.

20. The method as claimed in claim 19, wherein said step (b) further includes the substep of:

b3) wrapping a third plurality of galvanized armor wires outside of the second plurality of galvanized armor wires.

21. The method as claimed in claim 19, further comprising the step of:

b3) forming an intermediate layer composed of a polymer between the first and second pluralities of galvanized armor wires.

22. The method as claimed in claim 19, further comprising the step of:

b3) forming an outer jacket composed of a polymer outside of the first and second pluralities of galvanized armor wires.

* * * * *